United States Patent
Bucchi et al.

(10) Patent No.: US 8,790,815 B2
(45) Date of Patent: Jul. 29, 2014

(54) NICKEL COATED ALUMINUM BATTERY CELL TABS

(75) Inventors: Robert S. Bucchi, Lake Orion, MI (US); Daniel J. Casoli, Howell, MI (US); Kathleen M. Campbell, Troy, MI (US); Joseph Nicotina, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 373 days.

(21) Appl. No.: 13/009,889

(22) Filed: Jan. 20, 2011

(65) Prior Publication Data

US 2011/0195302 A1    Aug. 11, 2011

Related U.S. Application Data

(60) Provisional application No. 61/303,482, filed on Feb. 11, 2010.

(51) Int. Cl.
*H01M 2/24* (2006.01)
*H01M 2/30* (2006.01)
*H01M 2/32* (2006.01)
*H01M 2/02* (2006.01)

(52) U.S. Cl.
CPC .............. *H01M 2/30* (2013.01); *H01M 2/0212* (2013.01); *Y02E 60/12* (2013.01); *H01M 2/24* (2013.01); *H01M 2/32* (2013.01)
USPC ............................ 429/161; 429/179; 429/181

(58) Field of Classification Search
USPC ................................................ 428/650–654
See application file for complete search history.

(56) References Cited

U.S. PATENT DOCUMENTS

| 3,606,672 | A | * | 9/1971 | Terai et al. | 228/172 |
|---|---|---|---|---|---|
| 4,702,969 | A | * | 10/1987 | Bunkoczy et al. | 428/635 |
| 5,926,357 | A | * | 7/1999 | Elias et al. | 361/302 |
| 2010/0285352 | A1 | * | 11/2010 | Juzkow et al. | 429/163 |

FOREIGN PATENT DOCUMENTS

| CN | 101383407 A | 3/2009 |
|---|---|---|
| CN | 201307614 Y | 9/2009 |
| DE | 102008032270 A1 | 1/2010 |
| JP | 2001126709 A * | 5/2001 |
| JP | 2004039651 A * | 2/2004 |

OTHER PUBLICATIONS

JP 2004039651 A Machine Translation.*

* cited by examiner

*Primary Examiner* — Maria J Laios
*Assistant Examiner* — Robert S Carrico
(74) *Attorney, Agent, or Firm* — Dinsmore & Shohl LLP

(57) ABSTRACT

A battery cell tab is described. The battery cell tab is anodized on one end and has a metal coating on the other end. Battery cells and methods of making battery cell tabs are also described.

6 Claims, 9 Drawing Sheets

NICKEL COATED ALUMINUM BATTERY CELL TABS

STATEMENT OF RELATED CASES

This application claims the benefit of Provisional Application Ser. No. 61/303,482, filed Feb. 11, 2010, entitled Nickel Coated Aluminum Cell Tabs, which is incorporated herein by reference.

STATEMENT REGARDING FEDERALLY SPONSORED RESEARCH OR DEVELOPMENT

This invention was supported by the government under Contract No. DE-EE0002217 awarded by the Department of Energy. The government has certain rights in the invention.

BACKGROUND OF THE INVENTION

This invention relates generally to prismatic pouch cell batteries, and more particularly to coated aluminum battery cells tabs.

In the battery industry, battery cell tabs are joined together to create a low resistance joint. Reversible joining methods are desirable because they allow easy assembly and disassembly of battery cell modules. Reversible compression joining is a preferred method of assembly for cell tabs, provided the joint has low electrical resistance and long-term reliability.

Aluminum oxide naturally occurs on the surface of bare aluminum exposed to oxygen. The oxide layer protects the underlying metal from further oxidization (similar to rust). This naturally occurring oxide layer is not uniform in thickness or structure. The oxide layer reduces the surface conductivity of the aluminum.

Aluminum is commonly treated by a process of anodization, which grows a uniform oxide layer on the surface of the metal. Cell manufacturers use the anodized coating to protect aluminum cell tabs from chemical attack and to improve other attributes of the cell. The anodized coating is uniform and covers the entire cell tab, the portion outside the cell as well as the portion inside the cell.

The anodized coating is also an electrical insulator which increases resistance when joining cell tabs. The inherent resistance of the anodized coating limits the possible joining methods that can be used. For example, an anodized aluminum compression joint has about 250 micro-ohms of resistance, which is too high for most applications. An acceptable joint resistance is typically about 10 to about 50 micro-ohms. High resistance cell tab joints generate excess heat and reduce overall battery performance.

In order to obtain the low resistance needed for an aluminum cell tab joint, the anodized layer must be removed. Ultrasonic, laser, and resistance welding use high energy processes to remove or break up the oxide layer. The difficulty with laser and resistance welding processes is that when fusion joining copper (e.g., a copper buss) to aluminum cell tabs, the resulting joint is often brittle because of the alloying effect of mixing metals in a molten state. In order to avoid these problems, ultrasonic welding has been used. However, if too much energy is used when joining the cell tabs with ultrasonic welding, the excess energy is transmitted into the cell and can damage its delicate electrical connection to the cell tab. In addition, none of these joining methods are reversible, and they do not allow for replacement of a single cell. Consequently, if one cell fails, the entire module must be replaced, which significantly increases manufacturing and operating costs.

Soldering is also a common joining method. In this case, an acid flux is used to remove the oxide chemically prior to the soldering process. This process is reversible; however, the acid flux used to clean and remove the oxides for soldering, as well as the high heat, can cause issues with the cell seal around the cell tab, potentially causing electrolyte leakage. This also adds additional processes cost for manufacturing.

Therefore, there is a need for an improved cell tab and method of joining cell tabs.

SUMMARY OF THE INVENTION

The present invention meets this need. One aspect of the invention involves a battery cell tab. In one embodiment, the battery cell tab includes: an aluminum cell tab having an oxide-free first portion on one end with a metal coating thereon, and an anodized second portion on the other end, the metal coating being gold, tin, nickel, nickel alloys, nickel compounds, or combinations thereof.

Another aspect of the invention relates to a battery cell. In one embodiment, the battery cell includes a battery cell; and a pair of aluminum battery cell tabs, each aluminum battery cell tab having an oxide-free first portion on one end with a metal coating thereon, and an anodized second portion on the other end, wherein the second portion is inside the battery cell and the first portion is outside the battery cell, the metal coating being gold, tin, nickel, nickel alloys, nickel compounds, or combinations thereof.

Another aspect of the invention involves a method for making a bi-coated battery cell tab. One embodiment of the method includes removing an oxide layer from at least a first portion of an aluminum cell tab; depositing a metal coating on the first portion of the aluminum cell tab; and anodizing the aluminum cell tab a second portion of the aluminum cell tab.

DETAILED DESCRIPTION OF THE INVENTION

The battery cell tab is made of aluminum. The exposed portion of the aluminum battery cell tab is coated with a metal coating. Suitable metal coatings include, but are not limited to, gold, tin, and nickel, their alloys, their compounds, or combinations thereof. The oxide is removed from the aluminum cell tab before the metal coating is applied. However, if the entire aluminum cell tab was metal coated, the internal resistance of the battery would be increased. Therefore, the internal portion of the cell tab is anodized, as in the present manufacturing process. These coating steps are performed before the cell is assembled, and the bi-coated cell tab is processed in the same manner as in the existing cell manufacturing process.

The elimination of the oxidation layer and the utilization of the metal coated aluminum surface allows reversible joining processes to be used in making the battery cell assemblies. For example, reversible processes including, but not limited to, compression, staking, and mild flux soldering could be used. The use of reversible joining processes reduces the complexity of assembling batteries, the costs of assembly and warranty, and the amount of scrap generated during manufacture and repair.

Figure 1:
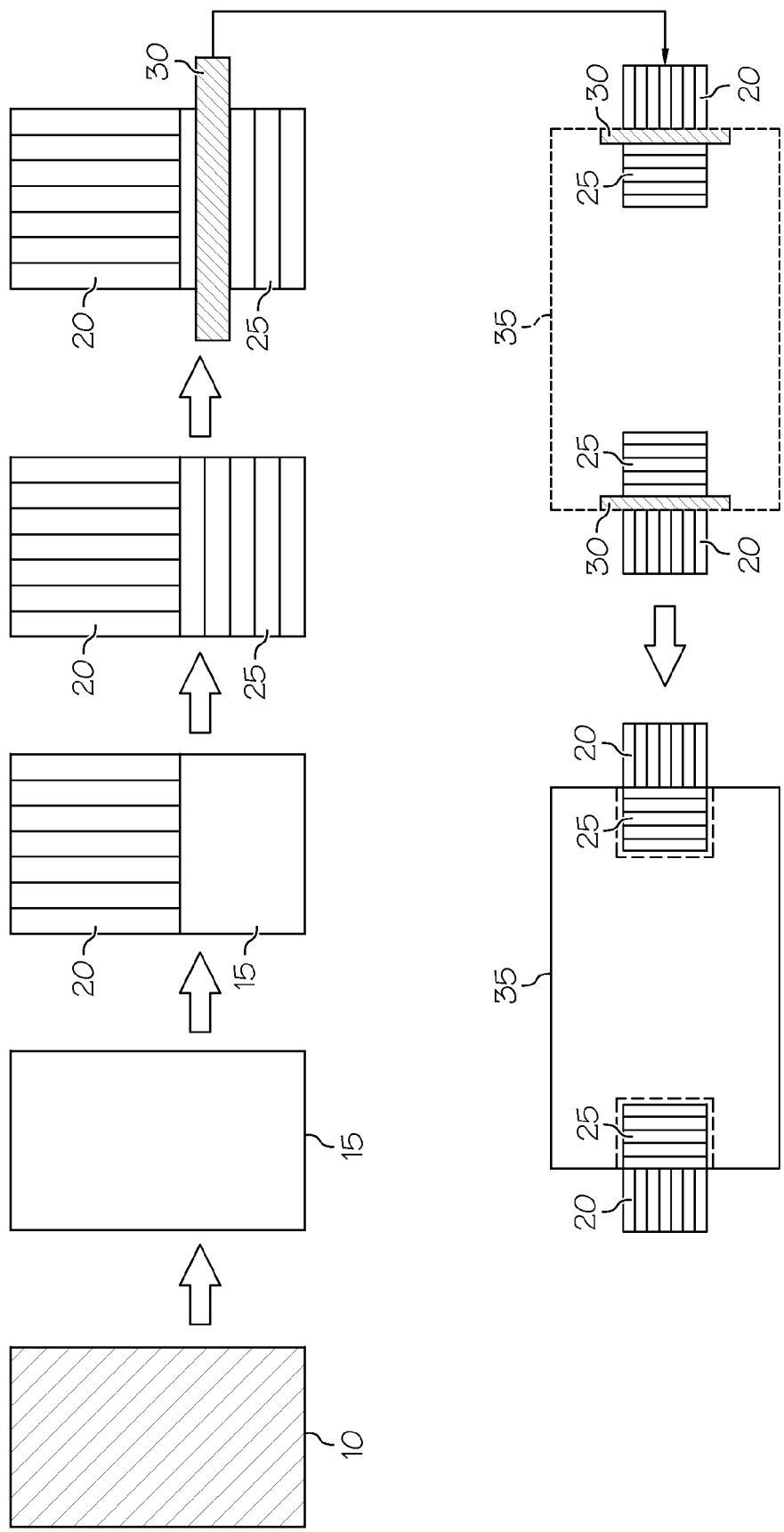
FIG. 1 is illustration of one embodiment of a process for a dual coated cell tab.

FIG. 1 shows one embodiment of a process for making the bi-coated cell tabs. The aluminum cell tab has a native oxide layer 10 on it. The native oxide layer 10 is removed from the aluminum cell tab to form a raw aluminum cell tab 15. The portion of the cell tab that will be outside the cell is then coated with metal, for example, nickel 20. Next, the portion of the cell tab that will be inside the cell is anodized 25. The bi-coated cell tab is then used in the normal cell assembly process, which includes applying a seal 30 to the bi-coated cell tab 20, 25, and assembling the bi-coated cell tabs into the battery cell 35. The finished cell has the nickel coated portion 20 of the aluminum cell tabs outside the cell 35 and the anodized portion 25 of the aluminum cell tab inside the cell 35.

The native oxide layer can be removed from the whole cell tab or from only a portion of the cell tab. The native oxide layer can be removed before or after the cell tab is anodized. The cell tab can be anodized before or after the metal coating is deposited.

The metal coating can be applied by a suitable method including, but not limited to coatings and mechanical cladding.

The resistance of a compression joint of two anodized aluminum cell tabs was measured. To measure resistance, battery tabs were overlapped, placed in a press, and compressed. Power leads were placed on each tab, and a DC current was applied. The compression force was varied. The voltage drop across the joint was measured using test leads that were clamped to the outside tab edges close to the overlap area.

Figure 2:
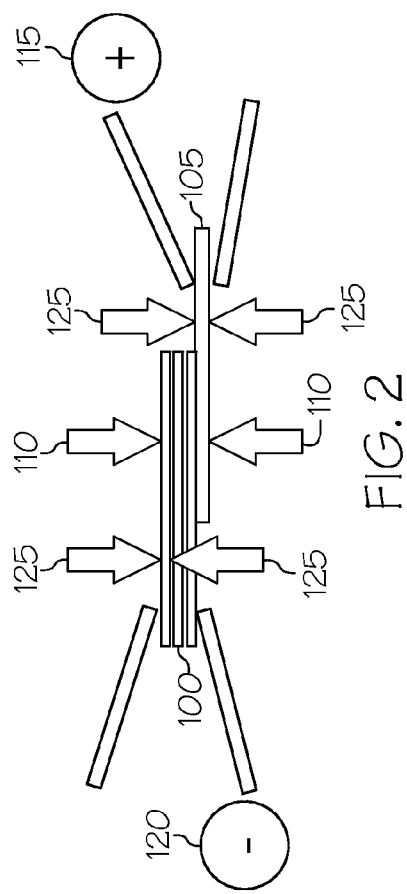
FIG. 2 is an illustration of the testing setup for measuring resistance

FIG. 2 shows a typical setup for measuring the resistance of a compression joint. As shown, there are 3 aluminum cell tabs to be joined with a copper plate. The same set-up was used for all the compression joints, with the type of joint and number of cell tabs varying as described below. The aluminum cell tabs 100 were placed with the copper plate 105 in the press 110 with a 10 mm overlap and compressed. Power leads 115, 120 were placed on the outside center edge of each tab, and a 10 A DC current was applied. The compression force was varied from 1 kN to 8 kN. The voltage drop across the joint was measured with voltage probes 125, and the resistance calculated by dividing the measured voltage drop by 10 A.

Figure 3:
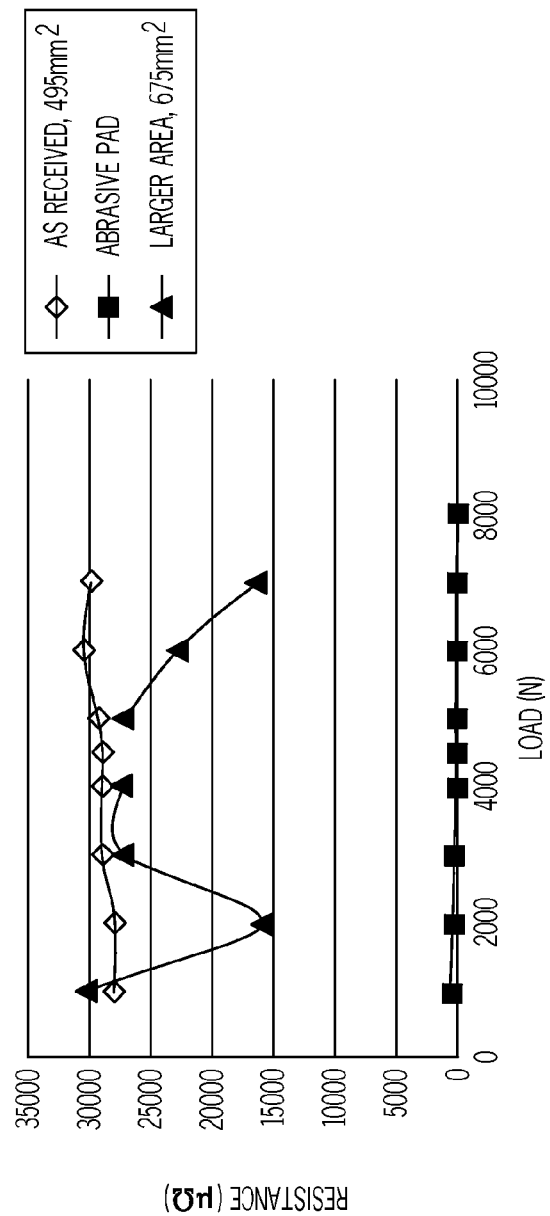
FIG. 3 is a graph showing the resistance as a function of load for an Al-Al tab compression joint before and after treatment with an abrasive pad.
Figure 4:
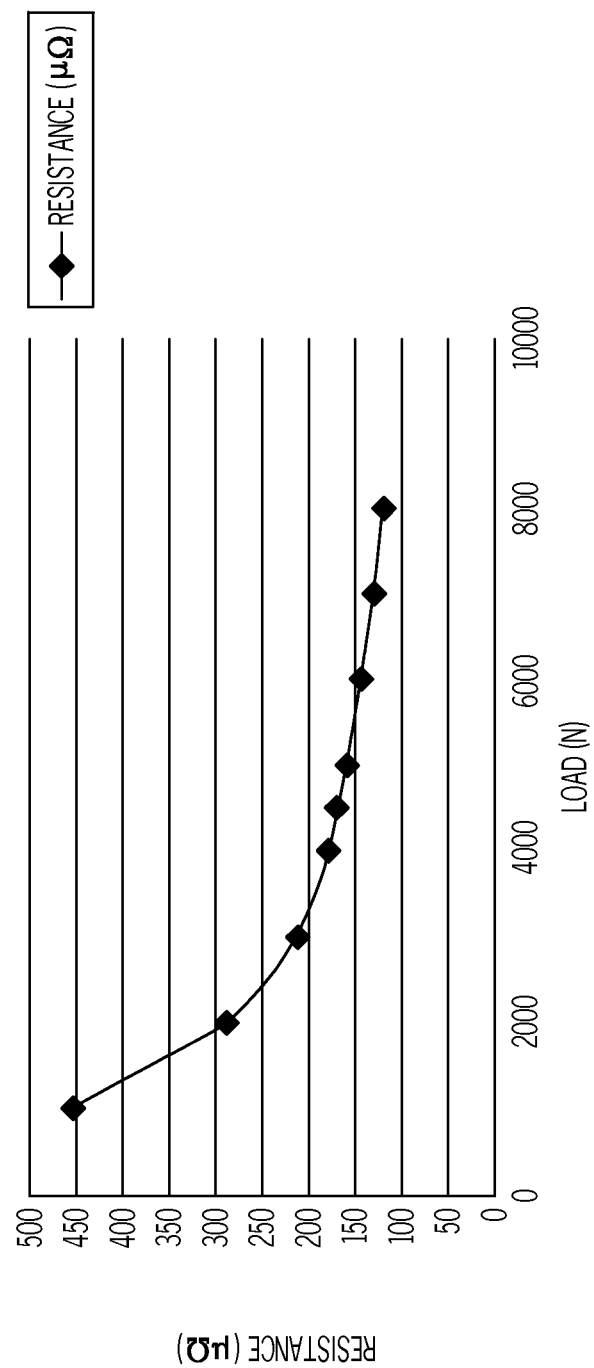
FIG. 4 is a graph showing the resistance as a function of load for an Al tab to Cu plate compression joint with no modification.

FIG. 3 shows the resistance of a compression joint of an aluminum cell tab to an aluminum cell tab with no modification. The resistance for the anodized aluminum tabs as received with a 495 mm$^2$ joint area was high, for example, about 27,000 μΩ at a load of 5000 N. Increasing the joint area to 675 mm$^2$ did not improve the resistance to a practical level. However, removing the anodized layer with an abrasive pad significantly reduced the resistance to about 150 μΩ at 5000 N, as shown in FIG. 4.

Figure 5:
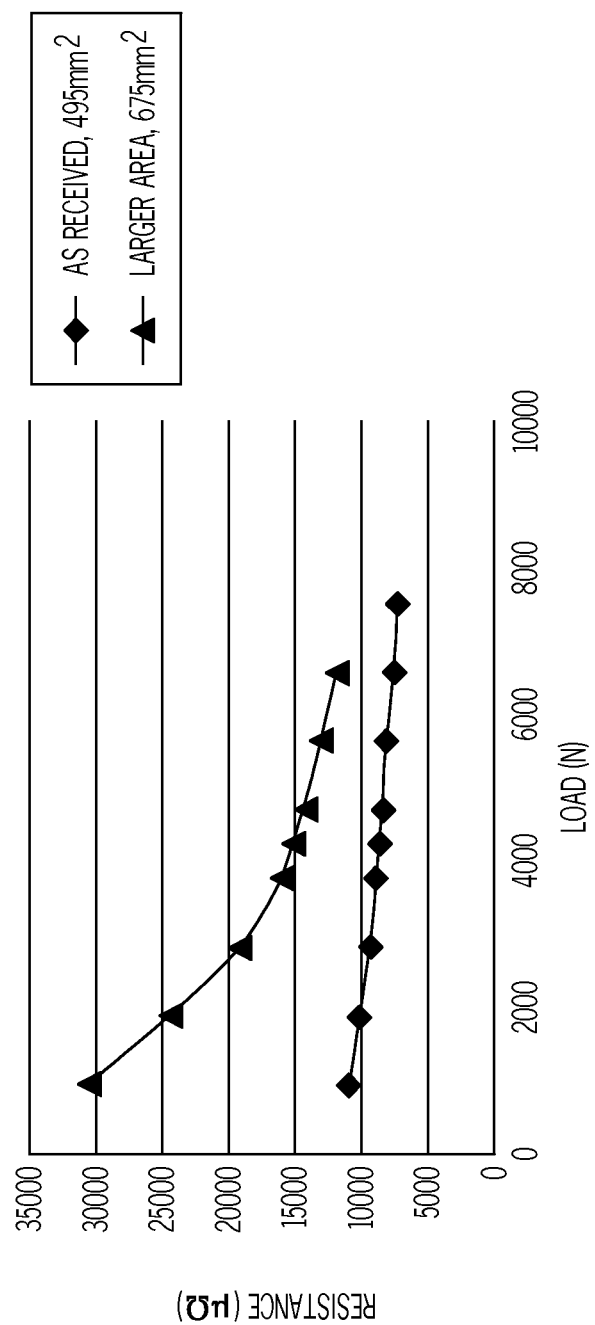
FIG. 5 is a graph showing the resistance as a function of load for an Al tab to Cu plate compression joint with different square area of contact.

FIG. 5 shows the resistance of a compression joint of an anodized aluminum cell tab to a copper plate (representing the high current buss). The resistance was about 8500 μΩ at 5000 N for the cell tab as received with a 495 mm$^2$ joint area; increasing the joint area to 675 mm$^2$ mm did not improve resistance. The resistance at low loads was worse for the larger area.

Figure 6:
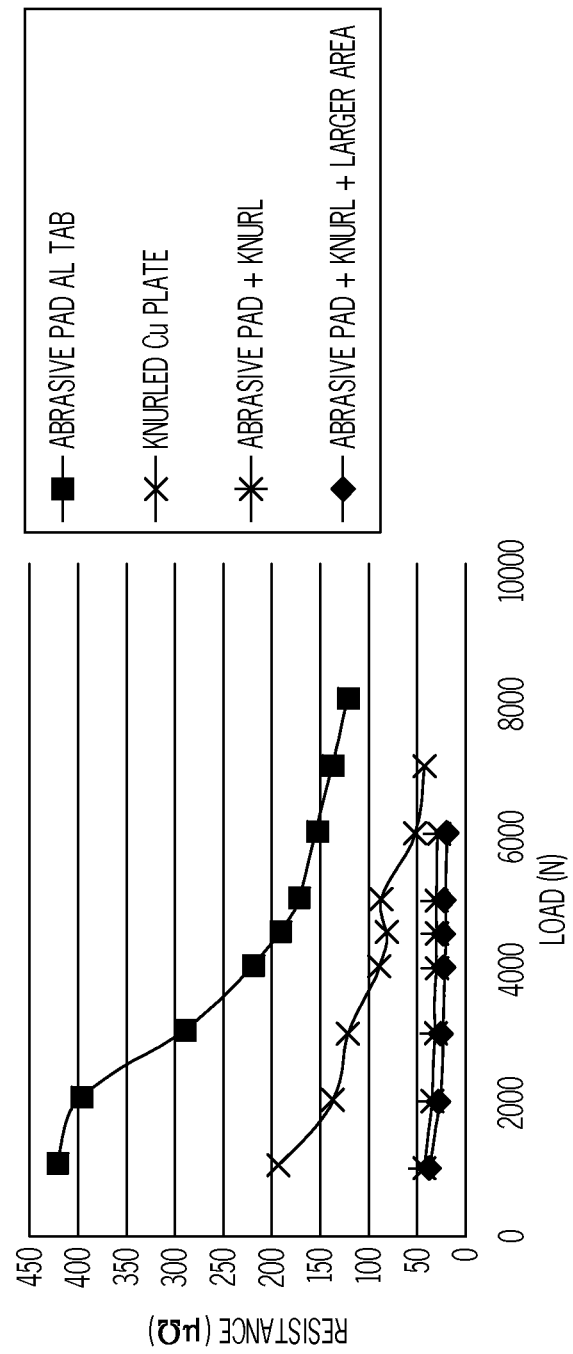
FIG. 6 is a graph showing the resistance as a function of load for an Al tab to Cu plate compression joint with various modifications.

FIG. 6 shows the resistance of a compression joint of an aluminum cell tab to a copper plate. The anodized layer was removed from the aluminum cell tab by rubbing with an abrasive pad. The resistance dropped significantly after the treatment with the abrasive pad to about 150 μΩ at 5000 N. The resistance was still high at lower loads. The combination of the abrasive pad treatment and knurling provided comparable resistance to a welded joint even at lower loads. However, the surface re-oxidizes over time with a resultant increase in resistance, as shown in Tables 1 and 2. In Table 2, the resistances were measured after 3 days.

TABLE 1

After Abrasive Pad Treatment (Al Tab)

| Load (N) | Voltage Drop @ 10A (mV) | Resistance (μΩ) | Resistance After 1 week (μΩ) |
|---|---|---|---|
| 1000 | 4.25 | 425 | 5447 |
| 2000 | 4.00 | 400 | 3601 |
| 3000 | 2.93 | 293 | 2345 |
| 4000 | 2.22 | 222 | 1800 |
| 4500 | 1.93 | 193 | 1550 |
| 5000 | 1.75 | 175 | 1380 |
| 6000 | 1.57 | 157 | 1110 |
| 7000 | 1.41 | 141 | 970 |
| 8000 | 1.27 | 127 | 810 |

TABLE 2

| Nitric Acid Anodize Removal | | De-ox Anodize Removal | |
|---|---|---|---|
| Voltage Drop @10A (mV) | Resistance (μΩ) | Voltage Drop @10A (mV) | Resistance (μΩ) |
| 7.7 | 770 | 6.1 | 610 |
| 6.28 | 628 | 5.4 | 540 |
| 5.4 | 540 | 4.95 | 495 |
| 4.79 | 479 | 4.4 | 440 |
| 4.63 | 463 | 4.14 | 414 |
| 4.3 | 430 | 3.9 | 390 |
| 3.7 | 370 | 3.5 | 350 |

Figure 7:
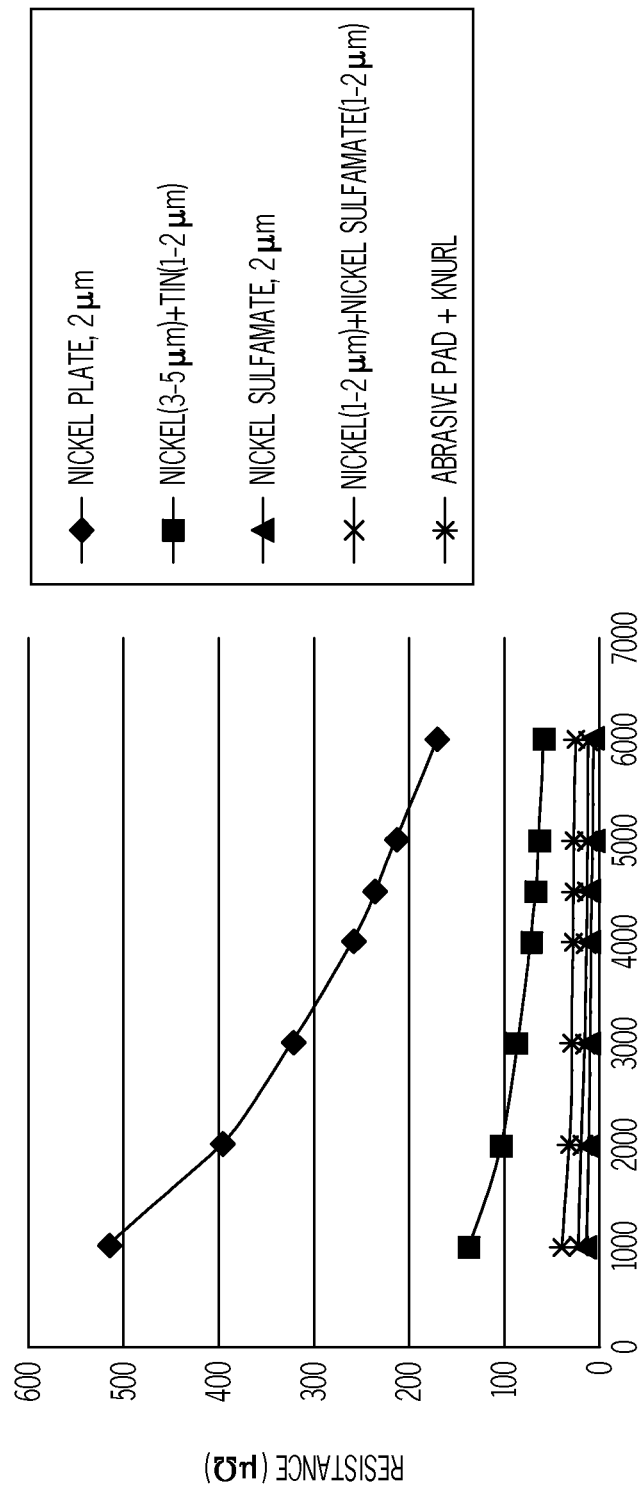
FIG. 7 is a graph showing the resistance as a function of load for an Al tab to Cu plate compression joint with various modifications.
Figure 8:
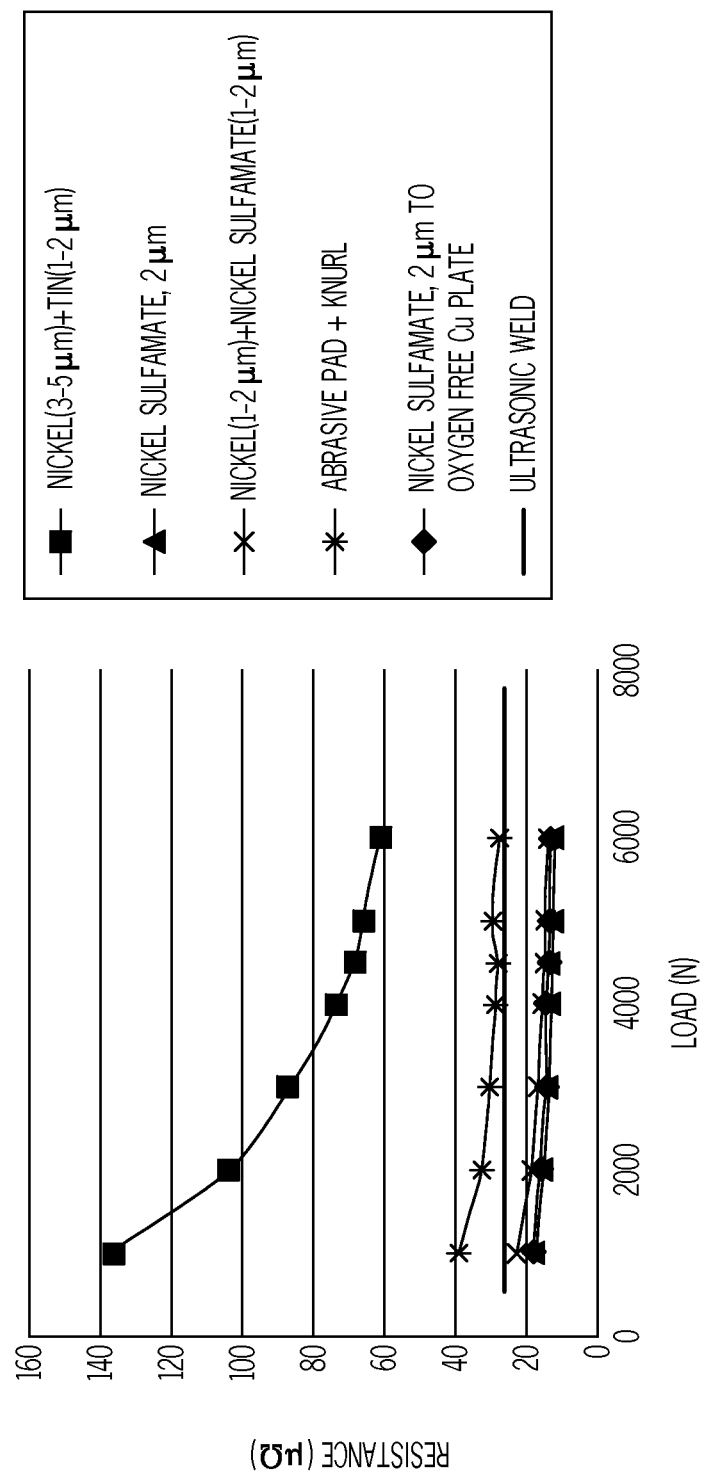
FIG. 8 is a graph showing the resistance as a function of load for an Al tab to Cu plate compression joint with various nickel coatings.
Figure 9:
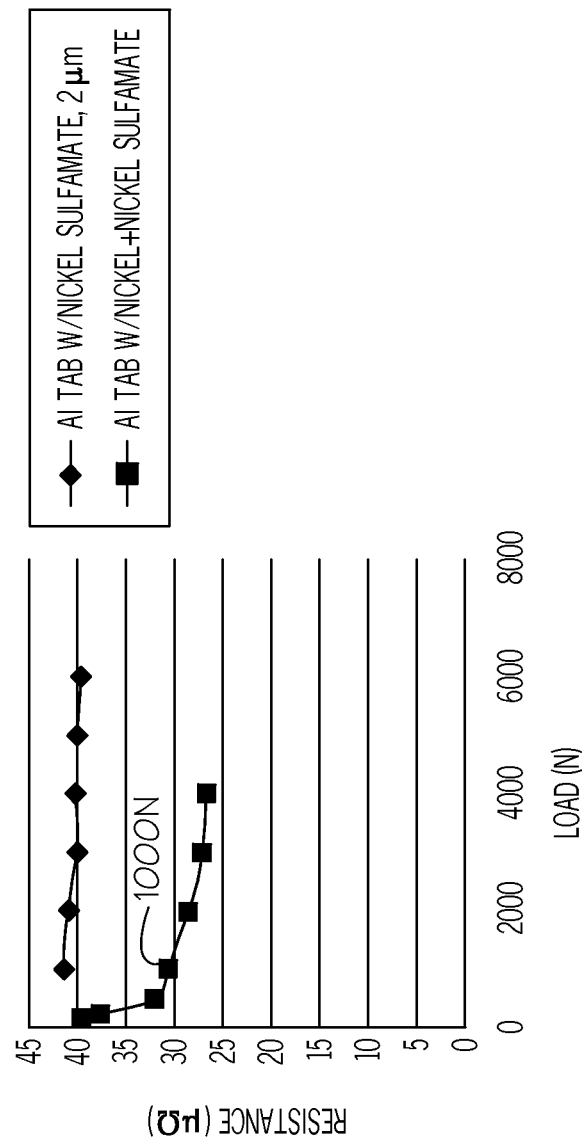
FIG. 9. Is a graph showing the resistance as a function of load for Al to Cu plate with nickel sulfumate and nickel-nickel sulfumate.

FIGS. 7-8 show the resistance of a compression joint of a coated aluminum cell tab to a copper plate. The anodized layer was removed, and the cell tabs were treated either by coating or with an abrasive pad and knurl. The nickel plating significantly reduced resistance, but not sufficiently for use in a cell. The aluminum cell tabs coated with 2 μm of nickel sulfamate, and 1-2 μm nickel/1-2 μm nickel sulfamate had resistances which were comparable to an ultrasonically welded joint. FIG. 9 shows that the aluminum tabs with nickel sulfamate and nickel/nickel sulfamate had acceptable resistance at lower loads.

Figure 10:
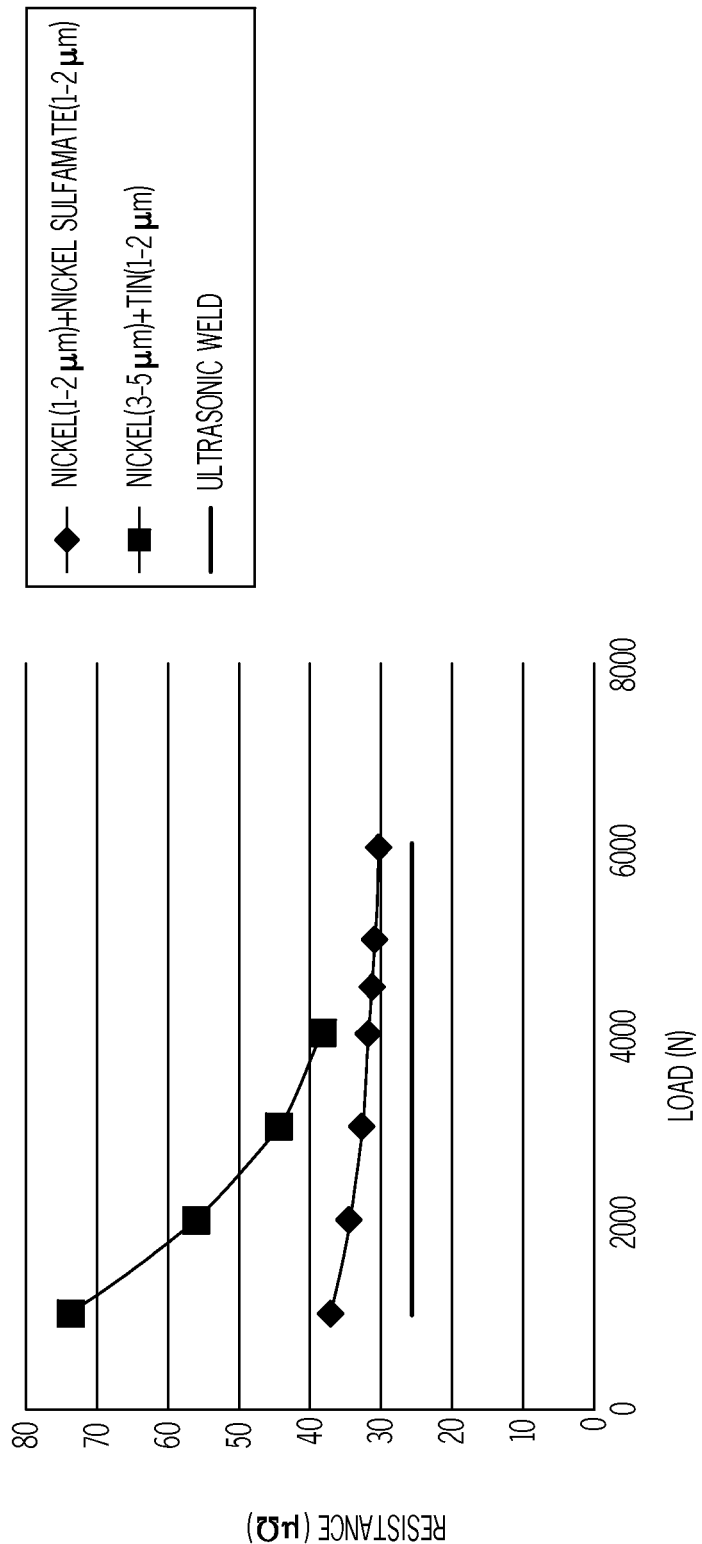
FIG. 10 is a graph showing the resistance as a function of load for an Al tab to Cu plate compression joint with various nickel coatings.

FIG. 10 shows the resistance of a compression joint of three aluminum cell tabs to a copper plate (as illustrated in FIG. 2).

The resistance for the coated aluminum cell tabs was comparable to an ultrasonic welded joint.

The coated aluminum cell tabs were tested under changing temperature and humidity conditions. The cell tabs were cycled among an intermediate temperature (25° C.), a high temperature (65° C.), and a low temperature (−10° C.) over a period of 10 days. The humidity was about 93% at the high and intermediate temperatures, it was about 80% during the transition between the high and intermediate temperatures, and it was uncontrolled below the intermediate temperature. The resistance after the corrosion test was compared to the initial resistance, as shown in Table 3.

TABLE 3

| Torque on each screw (in-lbs) | Approximate Load (N) | Voltage Drop (mV) | Resistance ($\mu\Omega$) | Resistance Post Corrosion ($\mu\Omega$) |
|---|---|---|---|---|
| Nickel + Sulfamate Nickel | | | | |
| 1.8 | 480 | 0.4 | 40 | 42.3 |
| 3.7 | 1000 | 0.37 | 37 | 39.2 |

The nickel coated cell tabs were shown to have improved resistance compared to the anodized cell tabs. The improved resistance allows the cell tabs to be joined by reversible joining methods such as compression, staking, soldering, and the like. This simplifies the joining process, and offers more cost-effective assembly methods. Reversible joining methods will help to reduce scrap rates.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A battery cell comprising:
    a battery cell;
    a pair of aluminum battery cell tabs, each aluminum battery cell tab having an oxide-free first portion on one end with a first metal coating thereon, and an anodized second portion on the other end, wherein the second portion is inside the battery cell and the first portion is outside the battery cell, the first metal coating having a thickness of 1 to 2 micrometers of a nickel-based compound comprising nickel sulfamate.

2. The battery cell of claim 1 further comprising a second metal coating disposed on the first metal coating, the second metal coating is nickel having a thickness of 1 to 2 micrometers, and after the second metal coating is added, a compression joint resistance is between about 10 and about 50 microohms.

3. The battery cell of claim 2 wherein the second metal coating of nickel has a thickness of 2 micrometers.

4. The battery cell of claim 1 wherein the first portion is about one half of the aluminum cell tab and the second portion is about one half of the aluminum cell tab.

5. The battery cell of claim 1 further comprising two seals, one applied to each cell tab of the pair of aluminum battery cell tabs, the seals located between the first portion and the second portion of each of the pair of aluminum battery cell tabs, wherein each of the pair of aluminum battery cell tabs is located on opposite sides of the cell.

6. The battery cell of claim 1 wherein each of the two seals contacts an inner wall of the cell.

* * * * *